US011676328B1

(12) United States Patent
Baize et al.

(10) Patent No.: US 11,676,328 B1
(45) Date of Patent: Jun. 13, 2023

(54) SYSTEMS AND METHODS FOR PRIORITIZED RENDERING AND STREAMING BASED ON RISK MAPS THAT PREDICT CHANGE IN A THREE-DIMENSIONAL ENVIRONMENT

(71) Applicant: Illuscio, Inc., Culver City, CA (US)

(72) Inventors: DonEliezer Baize, Los Angeles, CA (US); David Paul Watson, Montgomery, TX (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/048,973

(22) Filed: Oct. 24, 2022

(51) Int. Cl.
*G06T 15/06* (2011.01)
(52) U.S. Cl.
CPC .......... *G06T 15/06* (2013.01); *G06T 2200/04* (2013.01)
(58) Field of Classification Search
CPC ............................ G06T 15/06; G06T 2200/04
See application file for complete search history.

(56) References Cited

U.S. PATENT DOCUMENTS

| 8,493,383 | B1* | 7/2013 | Cook | G06T 15/06 345/589 |
| 11,062,515 | B1* | 7/2021 | Bogacz | G06T 19/003 |
| 11,138,800 | B1* | 10/2021 | Seiler | G02B 27/0172 |
| 2004/0125103 | A1* | 7/2004 | Kaufman | G06T 15/08 345/419 |
| 2008/0012879 | A1* | 1/2008 | Clodfelter | H04N 9/3147 345/619 |
| 2013/0009869 | A1* | 1/2013 | Wilensky | G06F 3/04883 345/156 |
| 2015/0109292 | A1* | 4/2015 | Lee | G06T 15/06 345/421 |
| 2015/0287158 | A1* | 10/2015 | Cerny | G09G 5/14 345/553 |
| 2018/0350044 | A1* | 12/2018 | Ponto | G06T 15/00 |
| 2019/0385353 | A1* | 12/2019 | Howson | G06T 15/30 |
| 2020/0357118 | A1* | 11/2020 | Yao | G06V 10/25 |
| 2022/0245936 | A1* | 8/2022 | Valk | G06V 10/764 |
| 2022/0405898 | A1* | 12/2022 | Dolgin | G06T 5/002 |

* cited by examiner

*Primary Examiner* — Michael Le
(74) *Attorney, Agent, or Firm* — Ansari Katiraei LLP; Arman Katiraei; Sadiq Ansari

(57) ABSTRACT

A system prioritizes the rendering and streaming of image data based on risk maps that predict change in a three-dimensional ("3D") environment. The system receives primitives that are distributed across a 3D space to represent the 3D environment. The system generates a first image based on primitives that fall within a first view frustum, and generates a risk map with a risk value for each particular pixel of the first image. Each risk value quantifies a probability that a pixel of the first image associated with that risk value changes as a result of changing the first view frustum to a second view frustum. The system then performs an out-of-order rendering of primitives that fall within the second view frustum based on the risk value for each first image pixel that is replaced in a second image with a rendered primitive from the second view frustum.

18 Claims, 7 Drawing Sheets

SYSTEMS AND METHODS FOR PRIORITIZED RENDERING AND STREAMING BASED ON RISK MAPS THAT PREDICT CHANGE IN A THREE-DIMENSIONAL ENVIRONMENT

BACKGROUND

A point cloud is a high resolution encoding a three-dimensional ("3D") environment. The point cloud has millions or billions of data points that represent different scanned points or surfaces within the 3D environment. The resources required to render such a large number of data points for any scene within the 3D environment, or to render movement or different scenes within the 3D environment at a smooth rate may exceed the resources of user devices used to view and/or interact with the 3D environment.

Accordingly, the point cloud processing and/or rendering may be offloaded from the user devices to a remote resource pool. The remote resource pool renders the large volume of data points for different scenes of an animation and streams the rendered data to a user device. Even in this scenario, the amount of rendered data that is generated for each frame or scene of an animation or movement within the 3D environment may be too large to transmit over existing data networks. For instance, the time it takes to transmit and present the rendered data for different scenes on the user device may be greater than the rate at which those scenes are rendered and/or are to be displayed on the user device.

DETAILED DESCRIPTION OF PREFERRED EMBODIMENTS

The following detailed description refers to the accompanying drawings. The same reference numbers in different drawings may identify the same or similar elements.

Provided are systems and methods for prioritized rendering and streaming of image data based on risk maps that predict change in a three-dimensional ("3D") environment. Specifically, the systems and methods include a rendering system that uses the risk maps to prioritize the rendering of different parts of a selected scene within the 3D environment, and/or to prioritize the sending of rendered image data for the different parts of the scene. For instance, the rendering system uses the risk maps to determine which pixels from a currently rendered scene are most likely to change when there is movement to a next scene, prioritizes the rendering of the image data or data points for those pixels in the next scene over the rendering of image data for other pixels of the next scene, and/or prioritizes the sending of data packets encoding the rendered pixels for the next scene by sending the data packets for the pixels that are most likely to change before the data packets for other pixels of the next scene.

In some embodiments, the rendering system generates the risk maps using linear gradients. The linear gradients quantify the amount of change occurring around or some specified distance from each rendered data point of the current scene. A risk assessment is associated with the pixels of the current scene based on the quantified amount of change for the image data or data points that produced those pixels. The risk assessment predicts the likelihood that a pixel will change as the represented scene from the 3D environment changes due to movement within the 3D environment.

Figure 1:
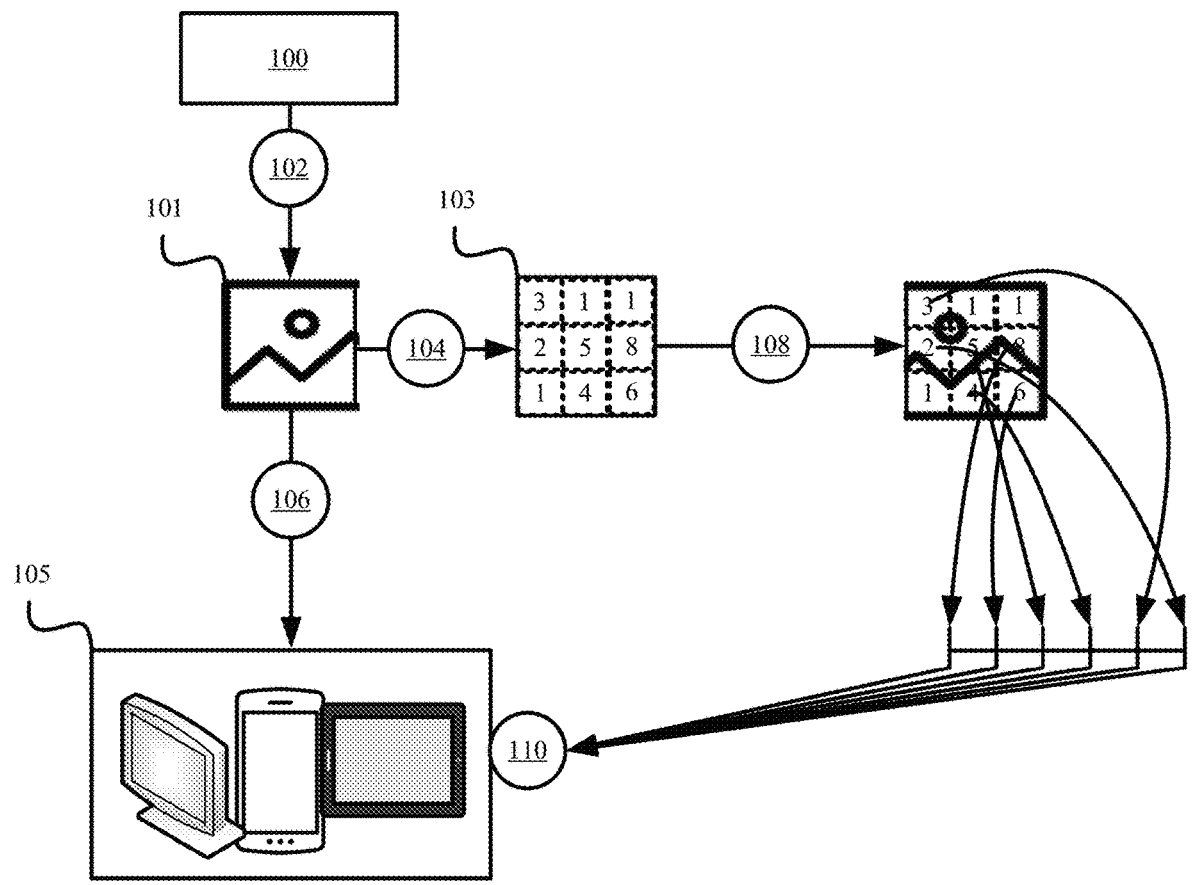
FIG. 1 illustrates performing an out-of-order rendering and streaming of image data based on a risk map in accordance with some embodiments presented herein.

FIG. 1 illustrates performing an out-of-order rendering and streaming of image data based on a risk map in accordance with some embodiments presented herein. Rendering system 100 generates (at 102) current scene 101 by rendering a set of image of data from a 3D environment that is within a current view frustum.

Rendering system 100 generates (at 104) risk map 103 for current scene 101. Risk map 103 associates probability values to different parts of current scene 101 that quantify the likelihood that those different parts of current scene 101 change for a next scene of the 3D environment. In some embodiments, the different probability values of risk map 103 are computed for individual pixels or sets of pixels of current scene 101. Each set of pixels with a computed risk probability may include a part of current scene 101 that has little or no variance amongst the pixels representing that part of current scene 101. For instance, a single probability value may be associated with a set of pixels that represent the same uniform surface or object in current scene 101.

Rendering system 100 provides (at 106) current scene 101 to one or more target devices 105. Target devices 105 may include devices with displays that have insufficient resources to render the different scenes of the 3D environment at a sufficient frame rate and/or at a desired resolution, and therefore rely on rendering system 100 to render the different scenes of the 3D environment on their behalf.

Rendering system 100 performs (at 108) the out-of-order rendering of a next scene in response to a change of the view frustum. Performing (at 108) the out-of-order rendering includes rendering the parts of the next scene that align with or correspond to the parts of risk map 103 with the largest probability values before rendering other parts of the next scene. Accordingly, rendering system 100 renders the data points in the changed view frustum for the next scene in a non-sequential order.

Rendering system 100 performs (at 110) the out-of-order streaming by transmitting the rendered image data for the parts of the next scene that align with or map to the parts of risk map 103 with the largest probabilities before transmitting the rendered image data for other parts of the next scene to one or more target devices 105. In performing (at 110) the out-of-order streaming, rendering system 100 ensures that one or more target device 105 receive and/or present the parts of the next scene that are associated with the greatest likelihood of change so that if there is insufficient bandwidth to stream all the rendered image data for the next scene, target devices 105 nevertheless update the parts of current scene 101 where there is the greatest expected amount of visual differentiation first.

Figure 2:
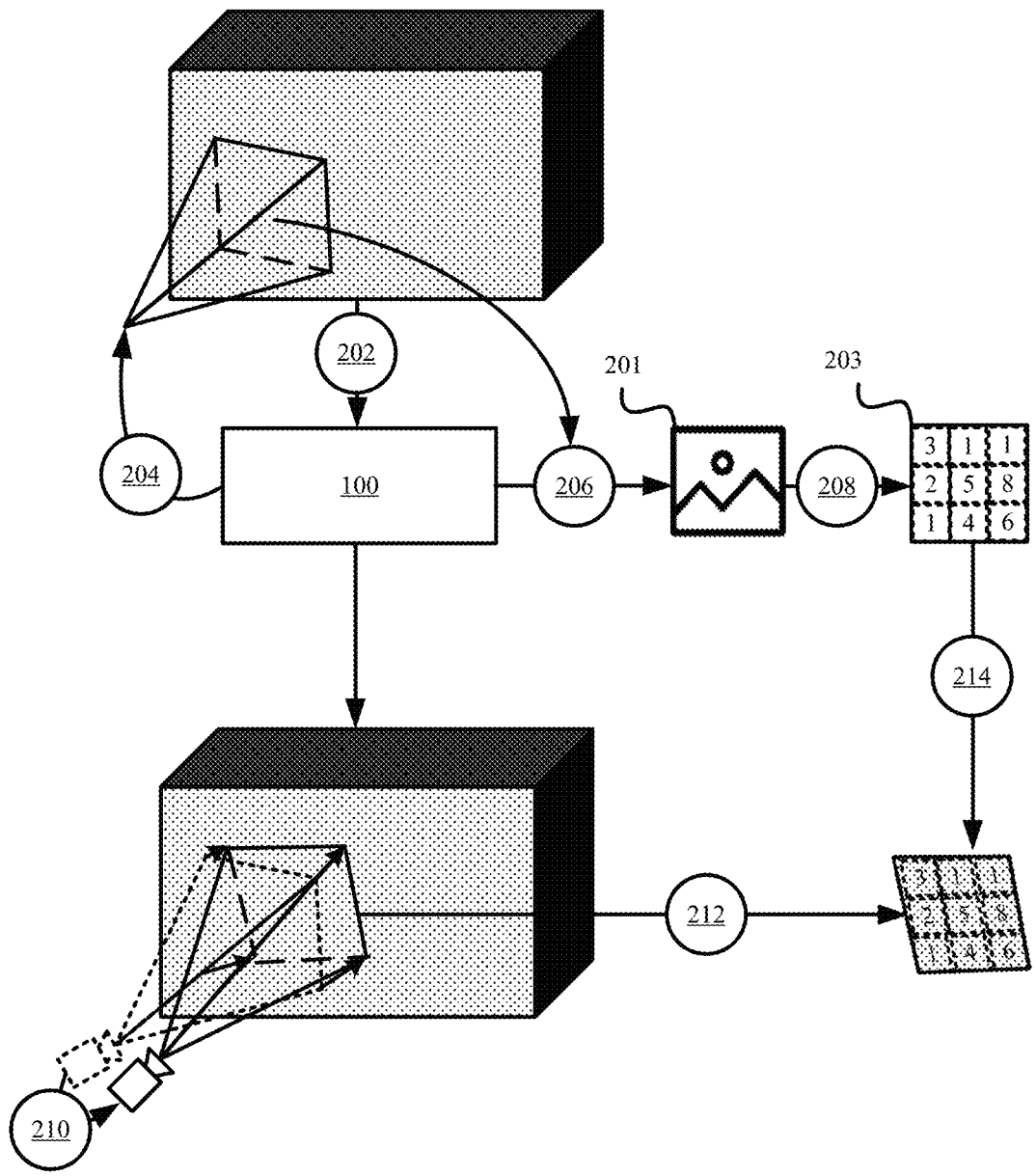
FIG. 2 illustrates an example mapping of a risk map to point cloud data points in accordance with some embodiments presented herein.

FIG. 2 illustrates an example mapping of a risk map to point cloud data points in accordance with some embodiments presented herein. Rendering system 100 receives (at 202) 3D data representing a 3D environment. In some embodiments, the 3D data includes data points of a point cloud. In some other embodiments, the 3D data includes meshes, polygons, and/or other constructs for creating the 3D environment.

The data points of a point cloud differ from pixels of a two-dimensional ("2D") image, because certain regions of the point cloud have no data points, lower densities of data points, and/or higher densities of data points based on varying amounts of visual information that is detected or scanned at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image has pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements.

The positional elements include coordinates within a 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point.

The non-positional elements may include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional element store other measured or derived characteristics including the chrominance, hardness, translucence, reflectivity, luminance, metallic characteristics, roughness, specular, diffuse, albedo, index of refraction ("IOR"), and/or other properties from the imaged surface, feature, or object. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of the data points. For instance, the characteristics may include a Tesla strength value to quantify the strength of the magnetic field that was used in detecting and/or imaging the surface, feature, or object represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

The same positional and non-positional elements apply to other 3D formats that encode a 3D environment with other primitives such as meshes or polygons. The meshes or polygons of other 3D formats may also be non-uniformly distributed across a 3D space. The term data point as used hereafter therefore interchangeably refers to data points of a point cloud or meshes, polygons, and/or primitives or constructs of other 3D formats that used to represent a 3D environment.

Rendering system 100 configures (at 204) a view frustum from which to render a first scene of the 3D environment. The view frustum may be configured by a user. For instance, the user may position a virtual camera to set the field-of-view from which to visualize the first scene. Alternatively, the view frustum may be preconfigured in the received (at 202) 3D data, and may correspond to an initial or default field-of-view from which to present the 3D environment.

Rendering system 100 selects (at 206) the data points that are positioned within the view frustum, and generates (at 208) first scene 201 based on the positional and non-positional elements of the selected (at 206) data points. Generating (at 208) first scene 201 includes rendering the selected (at 206) data points in the 3D space encompassed by the current view frustum to create the pixels that provide a 2D visualization of the 3D environment from the current view frustum. Accordingly, rendering system 100 converts the 3D image data (e.g., data points, polygons, meshes, etc.) within the current view frustum into 2D pixels of first scene 201.

Rendering system 100 generates (at 210) risk map 203 to associate a risk with each pixel of first scene 201. The risk associated with a particular pixel quantifies the probability that the attributes of the particular pixel will change in a next scene or as the current view frustum changes or shifts away from a current position and/or orientation. The pixel attributes include the pixel color components, such as RGB values, and/or other values (e.g., gamma, transparency, etc.) used by a display to present the visual characteristics of that pixel.

Rendering system 100 uses risk map 203 to prioritize the order with which pixels of a next scene are rendered and/or streamed to one or more target devices 105. Specifically, rendering system 100 tracks (at 210) the changes to the view frustum. The view frustum changes define the next scene from the 3D environment that is to be rendered and/or presented. The view frustum changes are gradual movements from a last position or orientation to an adjusted position or orientation, rather than an abrupt movement of the view frustum from one location in the 3D environment to an entirely different location in the 3D environment.

Rendering system 100 selects (at 212) the data points that are positioned within the adjusted view frustum for the next scene. Rendering system 100 maps (at 214) risk map 203 onto the selected (at 212) data points of the next scene. The mapping (at 214) identifies which data points of the selected (at 212) of the next scene contain the image data for rendering the pixels of risk map 203 with the highest likelihood of changing from the current scene to the next scene. In some embodiments, the mapping (at 214) involves aligning risk map 203 with the adjusted view frustum, projecting rays from the render position of the adjusted view frustum through each pixel of risk map 203, and identifying the data points that intersect or contact the ray projected through the pixels associated with the greatest risk of changing. Rendering system 100 then prioritizes the rendering of the selected (at 212) data points for the next scene in order according to the data points that intersect or contact the rays projected through the pixels associated with the greatest risk to the lowest risk, and prioritizes the streaming of the rendered image data accordingly.

Figure 3:
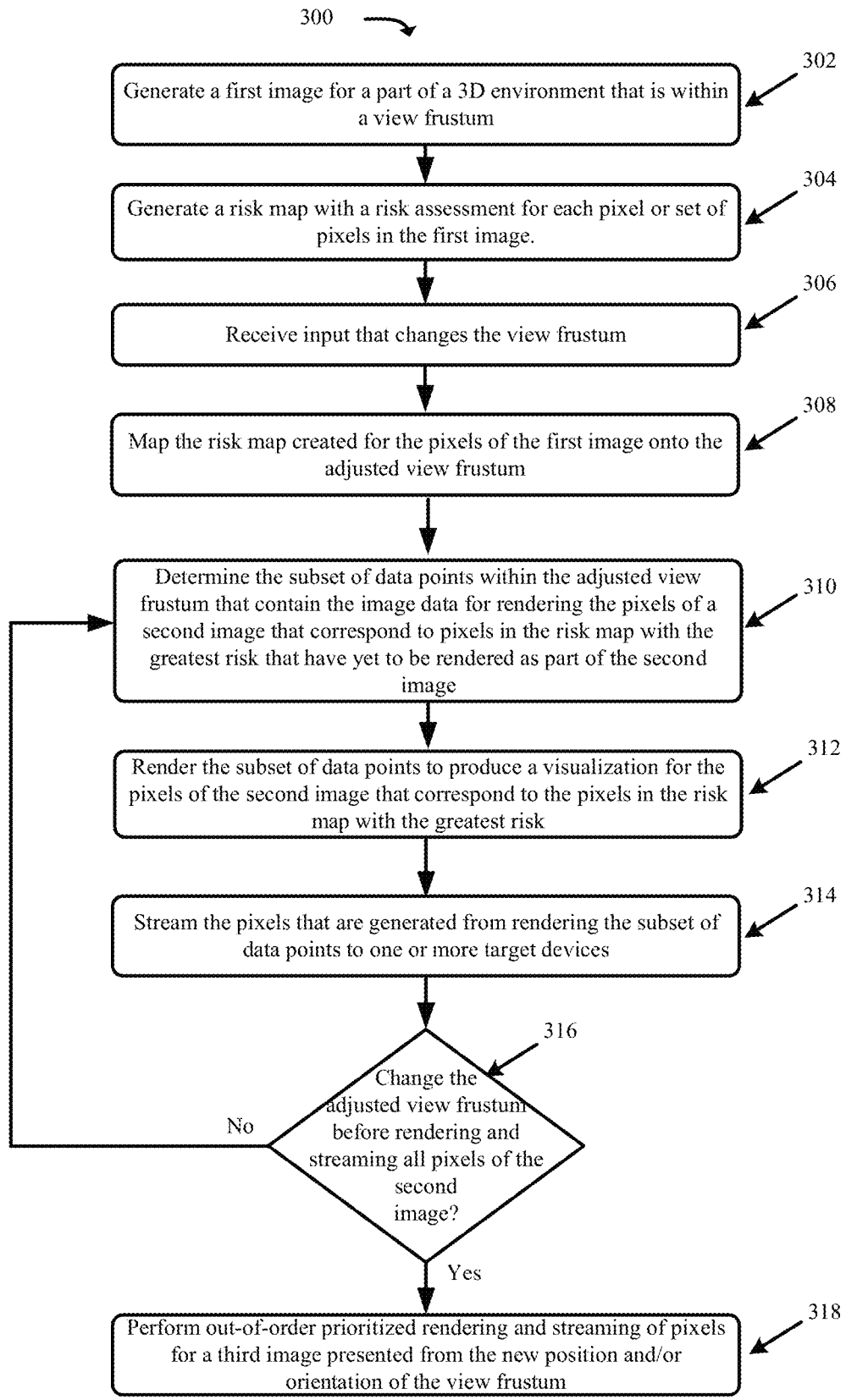
FIG. 3 presents a process for the predictive rendering and streaming of image data for a next scene based on risks computed for pixels of a current scene in accordance with some embodiments presented herein.

FIG. 3 presents a process 300 for the predictive rendering and streaming of image data for a next scene based on risks computed for pixels of a current scene in accordance with some embodiments presented herein. Process 300 is implemented by rendering system 100. Rendering system 100 includes one or more devices that accelerate the processing and/or rendering of complex 3D environments for different target devices. The one or more devices include one or more hardware processors (e.g., central processing units, graphics processing units, accelerated processing units, etc.), memory, storage, network controllers, and/or other compute resources for the risk map generating, the 3D image data rendering, the predictive streaming of image data, and/or other operations related to the out-of-order rendering and presentation of different scenes from a 3D environment. In some embodiments, rendering system 100 may be hosted in the cloud or may be remote to the target devices that request the different scenes of a 3D environment from rendering system 100 over a data network, and that receive the rendered image data for the requested scenes from rendering system 100 in the prioritized out-of-order sequencing determined from the generated risk maps.

Process 300 includes generating (at 302) a first image for a part of a 3D environment that is within a view frustum. Generating the first image includes rendering the data points, polygons, meshes, and/or other primitives that represent that part of the 3D environment in a point cloud or other 3D encoding of the 3D environment.

Process 300 includes generating (at 304) a risk map with a risk assessment for each pixel or set of pixels in the first image. In some embodiments, rendering system 100 generates (at 304) the risk map using linear gradients. The linear gradient that defines the risk associated with a particular pixel in the risk map may quantify the amount of change surrounding or neighboring the one or more data points that produced that particular pixel in the first image. In some embodiments, the linear gradient, that quantifies the risk associated with a pixel that is rendered from a particular data point, tracks the transition in color values and/or other descriptive characteristics between the particular data point and its neighboring data points or in a volume of 3D space surrounding the particular data point in the represented 3D environment. In some embodiments, the linear gradient tracks the number of other data points or different objects within a volume of 3D space surrounding the particular data point in the represented 3D environment. In any case, the risk assessment associated with a particular pixel in the first image is derived based on the amount of change occurring in the region surrounding the one or more data points that were rendered in order to produce that particular pixel.

Process 300 includes receiving (at 306) input that changes the view frustum. The input involves moving, rotating, and/or otherwise changing the view frustum from a first position and/or orientation, that resulted in the first image, to a second position and/or orientation. In other words, the input gradually moves the view frustum so that some of the data points used to render the first image remain within the view frustum at the second position and/or orientation.

Process 300 includes mapping (at 308) the risk map created for the pixels of the first image onto the adjusted view frustum. In some embodiments, rendering system 100 overlays or otherwise aligns the risk map with the field-of-view or image plane of the adjusted view frustum in the 3D environment. The image plane corresponds to the 2D flattening of the data points or the part of the 3D environment that falls within adjusted view frustum.

Process 300 includes determining (at 310) the subset of data points within the adjusted view frustum that contain the image data for rendering the pixels of a second image that correspond to pixels in the risk map with the highest risk of changing and/or the greatest risk that have yet to be rendered as part of the second image. Determining (at 310) the subset of data points includes projecting rays from the virtual camera or render position, that defines the adjusted view frustum, through the risk map that is aligned over the adjusted view frustum, and selecting the subset of data points that intersect or make contact with the rays projected through the pixels of the risk map that are associated with the highest risk.

Process 300 includes rendering (at 312) the subset of data points to produce a visualization for the pixels of the second image that correspond to the pixels in the risk map with the highest probability of change or the greatest risk. Accordingly, rendering system 100 performs an out-of-order rendering of the second image that provides a 2D visualization of the 3D environment from the adjusted view frustum. Specifically, rendering system 100 generates the pixels of the second image in a non-sequential order determined according to the risk associated with different pixels of the risk map.

Process 300 includes streaming (at 314) the pixels that are generated from rendering (at 312) the subset of data points or image data to one or more target devices. Accordingly, rendering system 100 sends the generated pixels of the second image that correspond to the pixels in the risk map with the greatest risk before sending other pixels of the second image to the target devices.

Process 300 includes determining (at 316) whether the adjusted view frustum is changed to a different part of the 3D environment before all data points within the adjusted view frustum for all pixels of the second image have been rendered and/or streamed. In response to determining (at 316—No) that the adjusted view frustum has not changed, process 300 determines (at 310) the next subset of data points for the remaining pixels of the second image with the greatest risk, renders (at 312) that next subset of data points, and streams (at 314) the rendered results to the target devices. In response to determining (at 316—Yes) that the adjusted view frustum has changed, process 300 halts the out-of-order prioritized rendering and streaming of the second image pixels that produce a visualization of the adjusted view frustum, and performs (at 318) the out-of-order prioritized rendering and streaming of pixels for a third image that collectively produce a visualization of the 3D environment from the new position and/or orientation of the view frustum. Performing (at 318) the out-of-order prioritized rendering and streaming includes updating the risk map by computing the risk that is associated with pixels of last generated scene, selecting data points within the updated view frustum based on the updated risk map, and rendering and streaming the data points in the order that they are selected based on the updated risk map.

Figure 4:
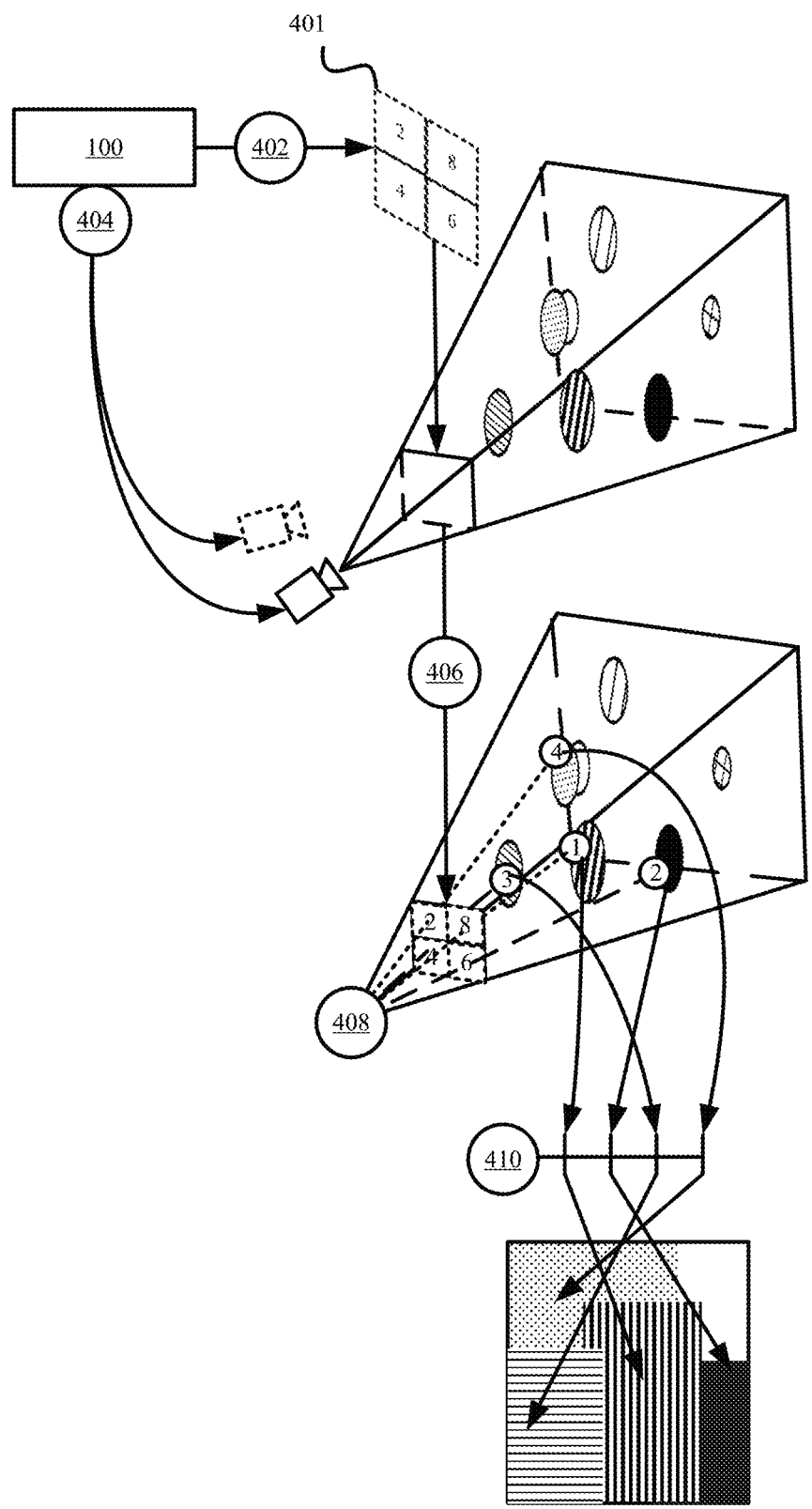
FIG. 4 illustrates an example of the prioritized selection and rendering of the data points within a view frustum of a current scene based on a risk map that is generated for the pixels of a previous scene in accordance with some embodiments presented herein.

FIG. 4 illustrates an example of the prioritized selection and rendering of the data points within a view frustum of a current scene based on a risk map that is generated for the pixels of a previous scene in accordance with some embodiments presented herein. Rendering system 100 generates (at 402) risk map 401 to assess the risk associated with the pixels of the previous scene changing if the view frustum is to change. For simplicity, risk map 401 is illustrated with four pixels or regions with an assessed risk. In actually, risk map 401 will have the same resolution or number of pixels as the image generated for the previous scene and/or all images or scenes at which the 3D environment is visualized, and a risk assessment for each pixel or a set of adjacent pixels.

Rendering system 100 tracks (at 404) movement of the view frustum from a previous position that captured the previous scene to a current position that captures the current scene. Tracking (at 404) the movement of the view frustum includes tracking the position and/or orientation of a virtual camera or a render position from which the view frustum originates and/or is defined. The size or resolution of the view frustum does not change as the virtual camera or render position is changed.

Rendering system 100 positions (at 406) risk map 401 onto the adjusted view frustum at the current position. Rendering system 100 projects (at 408) lines, vectors, or rays from the virtual camera or render position in the angle of and/or through the overlaid pixels of risk map 401. In some embodiments, rendering system 100 projects (at 408) the rays in order through the pixels of risk map 401 that are associated with the greatest risk to the pixels that are associated with the least risk.

Rendering system 100 detects which data points or other image data (e.g., polygons, meshes, and/or other 3D primitives) in the 3D environment intersect or are contacted by the projected (at 408) rays. Rendering system 100 selects the contacted data points, and renders (at 410) those data points out-of-order according to the risk associated with the pixel from risk map 401 that the intersected ray passed through.

In some embodiments, rendering system 100 generates and/or represents the risk map for the pixels of a generated scene using linear gradients. The linear gradients track the amount of change surrounding the data points that were rendered to produce different pixels of the risk map.

Figure 5:
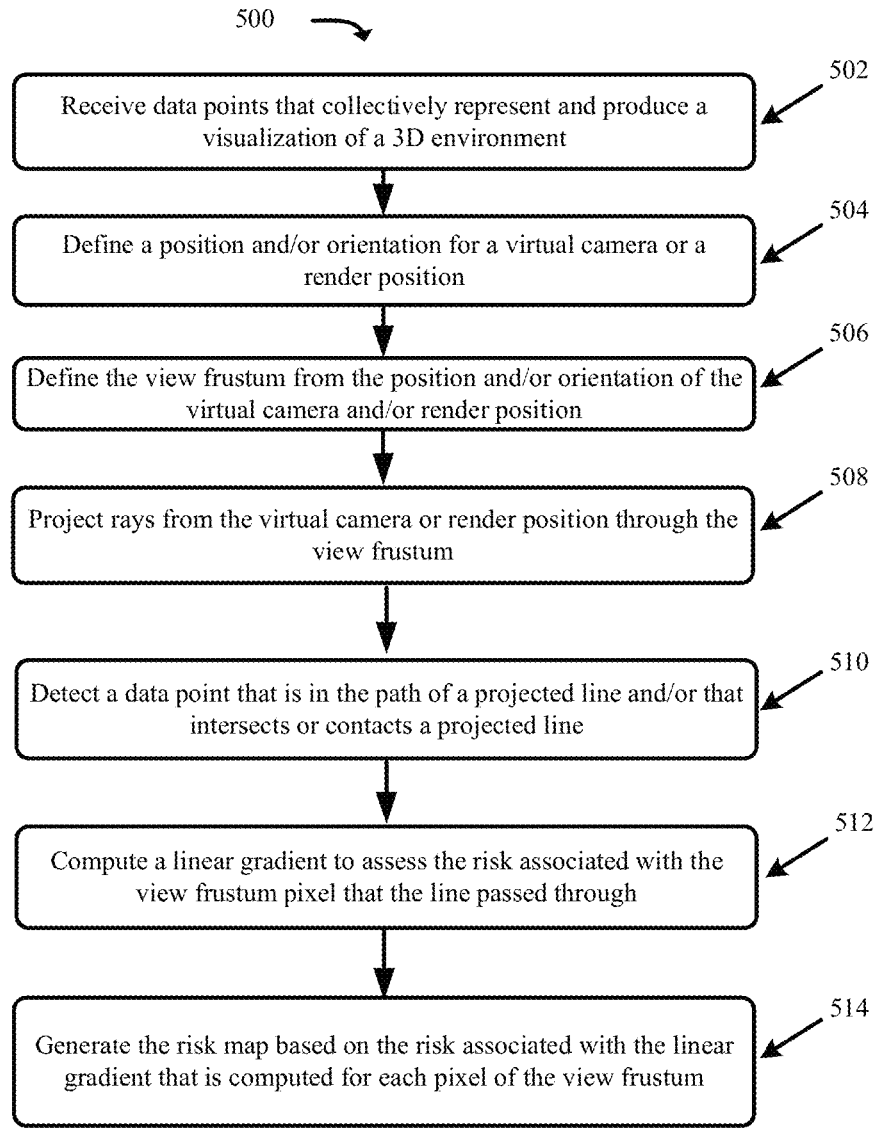
FIG. 5 presents a process for generating a risk map in accordance with some embodiments presented herein.

FIG. 5 presents a process 500 for generating a risk map in accordance with some embodiments presented herein. Process 500 is implemented by rendering system 100.

Process 500 includes receiving (at 502) data points, meshes, polygons, and/or other primitives that collectively represent and produce a visualization of a 3D environment. For instance, rendering system 100 receives (at 502) a point cloud that is 3D representation of a scanned 3D environment.

Process 500 includes defining (at 504) a position and/or orientation for a virtual camera or a render position. In some embodiments, user input defines (at 504) the position and/or orientation for the virtual camera. In some other embodiments, an initial position and/or orientation for the virtual camera is defined as part of the image data for the 3D environment, or is defined (at 504) by rendering system 100 or an application executed by rendering system 100.

Process 500 includes defining (at 506) the view frustum from the position and/or orientation of the virtual camera and/or render position. Defining (at 506) the view frustum includes extending a cone, pyramid, or other form from the virtual camera position or render position some distance into the 3D environment to establish a field-of-view for a first visualization of the 3D environment from the virtual camera position.

Process 500 includes projecting (at 508) a number of lines, rays, or vectors from the virtual camera or render position through the view frustum. In some embodiments, rendering system 100 projects a line for every pixel that is to be generated for the scene or image captured by the view frustum. Accordingly, the number of lines projected may be equal to the resolution at which the view frustum is rendered.

Process 500 includes detecting (at 510) a data point, mesh, polygon, or other primitive that is in the path of a projected line and/or that intersects or contacts a projected line. Rendering system 100 detects (at 510) the data point that is first intersected by or contacted by the projected line, wherein the data points that is first intersected by or contacted by the projected line is the data point that is visible in the rendered image of the view frustum and is not behind or obscured by other data points.

Process 500 includes computing (at 512) a linear gradient to assess the risk associated with the view frustum pixel that the line passed through. In some embodiments, computing (at 512) the linear gradient involves determining an amount of change surrounding or that is within a specified distance of the contacted data point, mesh, polygon, or other primitive.

Rendering system 100 may determine the amount of change using the surface normal of the contacted point. The surface normal may be encoded as a positional or non-positional element. The surface normal is a vector that is perpendicular to the surface represented by the contacted data point. In some embodiments, rendering system 100 assesses the risk associated with the contacted data point based on the angle of the surface normal relative to the projected line. In some such embodiments, a higher risk is associated with a smaller or more acute angle. For instance, the acute angle may indicate that the edge or end of the object represented by the contacted data point is directed towards the view frustum such that a movement of the view frustum may shift away from the object to another object producing a change in the pixel visualization. Conversely, a large angle may indicate that a larger portion of the object represented by the contacted data point remains within the view frustum such that a movement of the view frustum will result in the same object being presented within the view frustum, thereby reducing the risk of the pixel changing especially for a uniform object. Even if the visual characteristics of the object change, the changes are likely to be gradual which results in smaller changes to the pixels than if the view frustum transitions from one object to entirely different object. The linear gradient may record the angle of difference between the surface normal and movement of the view frustum in different directions (e.g., up, down, left, right, etc.), thereby providing a different risk assessment if the view frustum was moved in different directions.

In some embodiments, rendering system 100 reflects or bounces the line off the contacted data point, mesh, polygon, or other primitive according to the surface normal, continues projecting the line a given distance, and determines the number of reflections or data points that the line projects off of. A higher risk is associated with a larger number of reflections or contacted data points because the larger number of reelections or contacted data points indicates that there are other nearby objects that can change the visualization of the pixel if the view frustum is slightly moved off the first contacted data point. The linear gradient may record the number of reflections or objects detected in different directions from the contacted data point.

In some embodiments, rendering system 100 generates a plane that is perpendicular to the surface normal of the contacted point or that is parallel with the alignment of neighboring data points. Rendering system 100 determines the deviation in color and/or other descriptive characteristics between the data points in the generated plane, and assesses the risk associated with the contacted data point based on the deviation. The linear gradient may record the different amounts of deviation if the view frustum was moved to different sides of the generated plane.

Process 500 include generating (at 514) the risk map based on the risk associated with the linear gradient that is computed (at 512) for each pixel of the view frustum. The risk map provides a risk that quantifies the probability of the pixel changing as the view frustum changes. In some embodiments, the risk map provides an overall risk associated with each pixel, wherein the overall risk is determined from the linear gradient mapping of risk in different directions from the pixel. In some other embodiments, the risk map provides different risks associated with moving the view frustum in different directions from each pixel.

Figure 6:
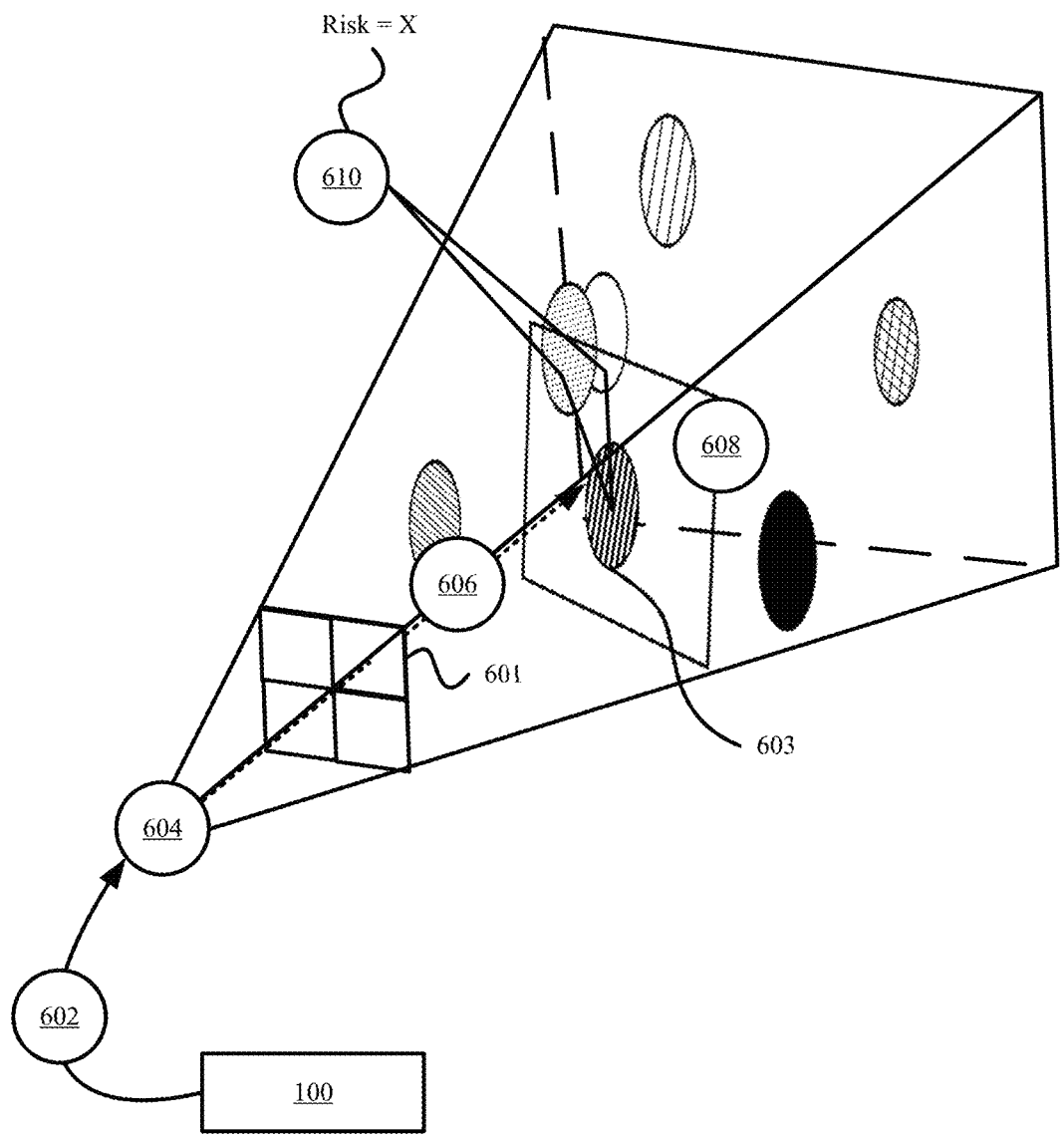
FIG. 6 illustrates an example of assessing the risk associated with a particular pixel in the risk map in accordance with some embodiments presented herein.

FIG. 6 illustrates an example of assessing the risk associated with a particular pixel in the risk map in accordance with some embodiments presented herein. Rendering system 100 tracks (at 602) the virtual camera position, and generates (at 604) an image with a set of pixels based on the data points, meshes, polygons, and/or other primitives from the 3D environment that fall within the view frustum of the current virtual camera position. For simplicity, FIG. 6 presents the image as a 2×2 grid of pixels. Rendering system 100 projects (at 606) a ray from the virtual camera position through pixel 601 pixel of the view frustum.

Rendering system 100 detects the intersection of the projected (at 606) ray and data point 603. Rendering system 100 generates (at 608) a plane based on the surface normal of the particular data point and/or the positioning of data points adjacent to or that neighbor data point 603. Rendering system determines the amount of change surrounding data point 603 across the generated plane, and computes (at 610) a risk score based on the determined amount of change.

In some other embodiments, rendering system 100 reflects the projected (at 606) ray off data point 603 according to the surface normal of data point 603. Rendering system 100 determines the angle of the reflected ray and/or determines the amount of nearby change based on other data points that the reflected ray makes contact with and differences in color values and/or other descriptive characteristics between the contacted data points and data point 603. Rendering system 100 may compute the risk score based on the determined angle or the determined amount of nearby change.

Figure 7:
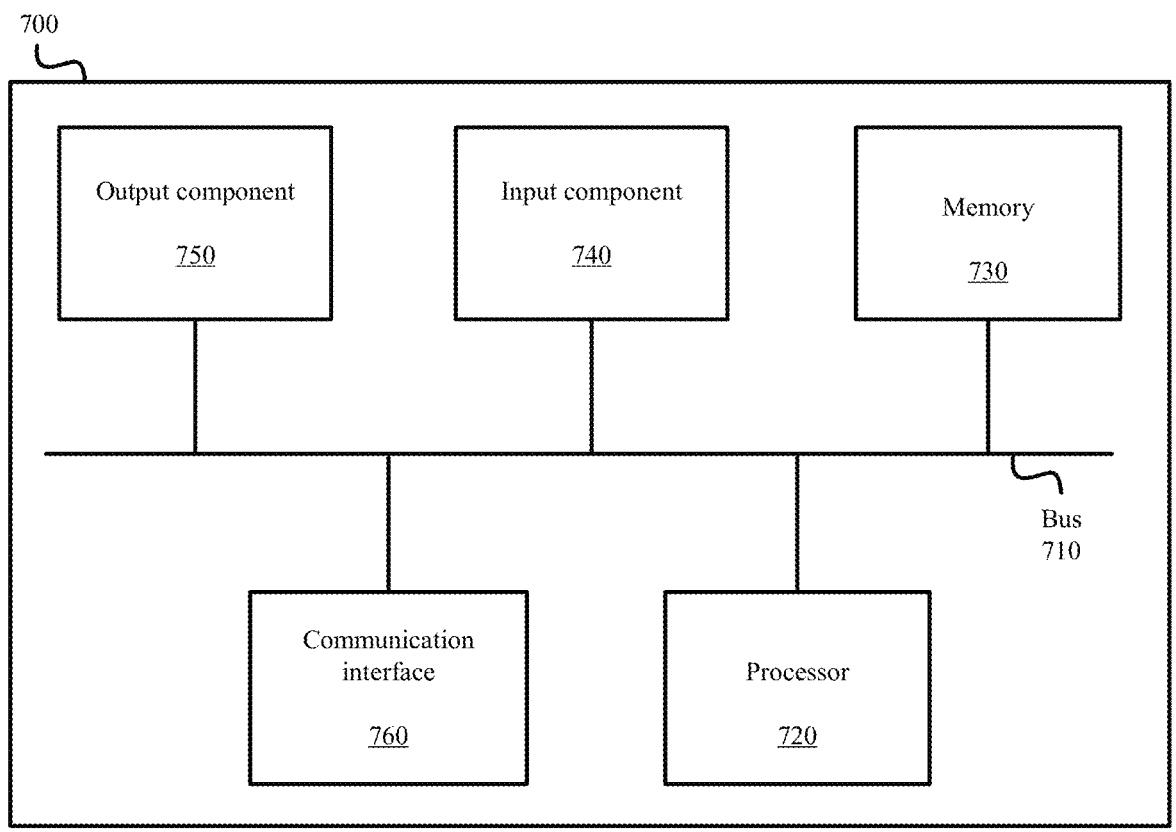
FIG. 7 illustrates example components of one or more devices, according to one or more embodiments described herein.

FIG. 7 is a diagram of example components of device 700. Device 700 may be used to implement one or more of the devices or systems described above (e.g., graphics system !T00, scanners, imaging devices, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a three-dimensional ("3D") environment comprising a plurality of primitives distributed across a 3D space;
    generating a first image based on a first set of the plurality of primitives that fall within a first view frustum, wherein the first image comprises a first set of pixels;
    generating a risk map comprising a risk value for each particular pixel of the first set of pixels, wherein the risk value quantifies a probability of that particular pixel changing as a result of changing the first view frustum to a second view frustum that includes a second set of the plurality of primitives;
    tracking a change of the first view frustum to the second view frustum;
    mapping each risk value from the risk map that was generated from the first set of pixels of the first image to a different primitive of the second set of primitives in the second view frustum based on each primitive of the second set of primitives being at a position in the second view frustum that aligns with a position of a pixel from the first set of pixels and the pixel being associated with a particular risk value; and
    performing an out-of-order rendering of the second set of primitives based on the mapping of each risk value, wherein performing the out-of-order rendering comprises generating a second image by rendering primitives from the second set of primitives in an order starting with primitives from the second set of primitives that are mapped to a largest risk value of the risk map and ending with primitives from the second set of primitives mapped to a smallest risk value of the risk map.

2. The method of claim 1, wherein performing the out-of-order rendering further comprises:
    determining a first pixel of the first set of pixels that is associated with a first risk value and that is created in the second image by a first primitive of the second set of primitives;
    determining a second pixel of the first set of pixels that is associated with a second risk value and that is created in the second image by a second primitive of the second set of primitives, wherein the first pixel is separated from the second pixel by at least one other pixel in the first set of pixels; and
    rendering the second primitive before the first primitive in response to the second risk value being greater than the first risk value.

3. The method of claim 2 further comprising:
streaming a first result produced from rendering the second primitive before a second result produced from rendering the first primitive to a display device.

4. The method of claim 1,
wherein mapping each risk value comprises:
positioning the risk map over the second view frustum;
projecting a ray through each pixel of the first set of pixels that is represented in the risk map;
detecting a first ray passing through a pixel represented in the risk map that is associated with a first risk value, and intersecting a first primitive of the second set of primitives; and
detecting a second ray passing through a pixel represented in the risk map that is associated with a second risk value, and intersecting a second primitive of the second set of primitives; and
wherein performing the out-of-order rendering further comprises:
rendering the second primitive before the first primitive in response to the second risk value being greater than the first risk value.

5. The method of claim 1 further comprising:
generating a linear gradient based on an amount of change surrounding each primitive of the first set of primitives; and
wherein generating the risk map comprises deriving the risk value for each particular pixel of the first set of pixels based on the linear gradient that is generated for a primitive of the first set of primitives that was rendered to produce that particular pixel.

6. The method of claim 1 further comprising:
performing an out-of-order streaming of a second set of pixels that are generated for the second image based on the out-of-order rendering of the second set of primitives.

7. The method of claim 1, wherein generating the risk map comprises:
positioning the first set of pixels relative to the first view frustum;
projecting a ray through a first pixel of the first set of pixels that intersects a particular primitive of the first set of primitives in the 3D environment; and
computing the risk value for the first pixel based on an amount of change around the particular primitive.

8. The method of claim 7, wherein computing the risk value for the first pixel comprises:
determining an angle of difference between the ray intersecting the particular primitive and a surface normal of the particular primitive; and
defining the risk value for the first pixel based on the angle of difference.

9. The method of claim 7, wherein computing the risk value for the first pixel comprises:
generating a plane based on one or more of a surface normal of the particular primitive or a positioning of primitives that are adjacent to the particular primitive;
determining the amount of change across the plane; and
defining the risk value for the first pixel based on the amount of change across the plane.

10. The method of claim 7, wherein computing the risk value for the first pixel comprises:
reflecting the ray off the particular primitive based on a surface normal of the particular primitive;
determining a number of other primitives from the plurality of primitives that the ray intersects and reflects off after reflecting the ray off the particular primitive; and
defining the risk value for the first pixel based on the number of other primitives that the ray intersects and reflects off.

11. A rendering system comprising:
one or more hardware processors configured to:
receive a three-dimensional ("3D") environment comprising a plurality of primitives distributed across a 3D space;
generate a first image based on a first set of the plurality of primitives that fall within a first view frustum, wherein the first image comprises a first set of pixels;
generate a risk map comprising a risk value for each particular pixel of the first set of pixels, wherein the risk value quantifies a probability of that particular pixel changing as a result of changing the first view frustum to a second view frustum that includes a second set of the plurality of primitives;
track a change of the first view frustum to the second view frustum;
map each risk value from the risk map that was generated from the first set of pixels of the first image to a different primitive of the second set of primitives in the second view frustum based on each primitive of the second set of primitives being at a position in the second view frustum that aligns with a position of a pixel from the first set of pixels and the pixel being associated with a particular risk value; and
perform an out-of-order rendering of the second set of primitives based on the mapping of each risk value, wherein performing the out-of-order rendering comprises generating a second image by rendering primitives from the second set of primitives in an order starting with primitives from the second set of primitives that are mapped to a largest risk value of the risk map and ending with primitives from the second set of primitives mapped to a smallest risk value of the risk map.

12. The rendering system of claim 11, wherein performing the out-of-order rendering further comprises:
determining a first pixel of the first set of pixels that is associated with a first risk value and that is created in the second image by a first primitive of the second set of primitives;
determining a second pixel of the first set of pixels that is associated with a second risk value and that is created in the second image by a second primitive of the second set of primitives, wherein the first pixel is separated from the second pixel by at least one other pixel in the first set of pixels; and
rendering the second primitive before the first primitive in response to the second risk value being greater than the first risk value.

13. The rendering system of claim 12, wherein the one or more hardware processors are further configured to:
stream a first result produced from rendering the second primitive before a second result produced from rendering the first primitive to a display device.

14. The rendering system of claim 11,
wherein mapping each risk value comprises:
positioning the risk map over the second view frustum;
projecting a ray through each pixel of the first set of pixels that is represented in the risk map;
detecting a first ray passing through a pixel represented in the risk map that is associated with a first risk value, and intersecting a first primitive of the second set of primitives; and detecting a second ray passing through a pixel represented in the risk map that is associated with a second risk value, and intersecting a second primitive of the second set of primitives; and wherein performing the out-of-order rendering further comprises:
rendering the second primitive before the first primitive in response to the second risk value being greater than the first risk value.

15. The rendering system of claim 11, wherein the one or more hardware processors are further configured to:
generate a linear gradient based on an amount of change surrounding each primitive of the first set of primitives; and wherein generating the risk map comprises deriving the risk value for each particular pixel of the first set of pixels based on the linear gradient that is generated for a primitive of the first set of primitives that was rendered to produce that particular pixel.

16. The rendering system of claim 11, wherein the one or more hardware processors are further configured to:
perform an out-of-order streaming of a second set of pixels that are generated for the second image based on the out-of-order rendering of the second set of primitives.

17. The rendering system of claim 11, wherein generating the risk map comprises:
positioning the first set of pixels relative to the first view frustum;
projecting a ray through a first pixel of the first set of pixels that intersects a particular primitive of the first set of primitives in the 3D environment; and
computing the risk value for the first pixel based on an amount of change around the particular primitive.

18. A non-transitory computer-readable medium storing program instructions that, when executed by one or more hardware processors of a rendering system, cause the rendering system to perform operations comprising:
receive a three-dimensional ("3D") environment comprising a plurality of primitives distributed across a 3D space;
generate a first image based on a first set of the plurality of primitives that fall within a first view frustum, wherein the first image comprises a first set of pixels;
generate a risk map comprising a risk value for each particular pixel of the first set of pixels, wherein the risk value quantifies a probability of that particular pixel changing as a result of changing the first view frustum to a second view frustum that includes a second set of the plurality of primitives;
track a change of the first view frustum to the second view frustum;
map each risk value from the risk map that was generated from the first set of pixels of the first image to a different primitive of the second set of primitives in the second view frustum based on each primitive of the second set of primitives being at a position in the second view frustum that aligns with a position of a pixel from the first set of pixels and the pixel being associated with a particular risk value; and
perform an out-of-order rendering of the second set of primitives based on the mapping of each risk value, wherein performing the out-of-order rendering comprises generating for each particular pixel of the first set of pixels a second image by rendering primitives from the second set of primitives in an order starting with primitives from the second set of primitives that are mapped to a largest risk value of the risk map and ending with primitives from the second set of primitives mapped to a smallest risk value of the risk map.

* * * * *